United States Patent [19]

Rotz

[11] Patent Number: 4,471,850

[45] Date of Patent: Sep. 18, 1984

[54] ARTICULATED VEHICLE

[75] Inventor: Dana R. Rotz, Shippensburg, Pa.

[73] Assignee: Ingersoll-Rand Company, Woodcliff Lake, N.J.

[21] Appl. No.: 478,659

[22] Filed: Mar. 25, 1983

[51] Int. Cl.³ .............................................. B62D 5/10
[52] U.S. Cl. .................................... 180/136; 280/468; 404/126
[58] Field of Search ................ 180/134, 135, 136, 137, 180/138, 139; 280/462, 467, 463, 468, 459; 404/126, 125

[56] References Cited

U.S. PATENT DOCUMENTS

| | | | |
|---|---|---|---|
| 2,665,144 | 1/1954 | Birdwell | 280/462 |
| 3,367,437 | 2/1968 | Garrett | 180/139 |
| 3,947,142 | 3/1976 | Takata et al. | 404/126 |
| 4,116,459 | 9/1978 | Kreitzberg | 180/138 |

FOREIGN PATENT DOCUMENTS 556290  9/1943  United Kingdom ................ 280/459

Primary Examiner—David M. Mitchell
Assistant Examiner—D. Lynn Fugate
Attorney, Agent, or Firm—B. J. Murphy

[57] ABSTRACT

In the exemplary embodiment shown, the vehicle is a drum-type asphalt compactor having a pair of drum-compactor units coupled together for steering articulation. The units have prescribed axes of travel, and are coupled together for travel with the axes in line with, transverse to, or offset from, each other. A hydraulic piston and cylinder actuator displaces a coupling link, which is commonly, pivotedly joined to the units, to bring the travel axes into a transverse disposition. Another link or lock bar, freely engageable and disengageable from one of the units, is used also to couple the units together for the purpose of cooperating with the actuator and coupling link to bring the travel axes into an offset, parallelism.

12 Claims, 3 Drawing Figures

ARTICULATED VEHICLE

This invention pertains to articulated vehicles, and in particular to such vehicles which employ hydraulic or other actuators to effect articulation thereof. By way of example, the invention is set forth in use with an articulated drum-type asphalt compactor having a pair of drum-compactor vehicular units coupled together.

Prior art vehicles of the aforesaid type require and employ a plurality of hydraulic, or air, piston and cylinder actuators to effect desired articulations: left turns, right turns, and/or offset or crab steering. Typical of the prior art vehicles is the Articulated Pavement Compacting Machine disclosed in U.S. Pat. No. 3,947,142, issued to Harry H. Takata et al. on Mar. 30, 1976. The patented Machine requires and employs four actuators to effect articulations.

It is an object of this invention to disclose an articulated vehicle which requires and employs only a single actuator to perform all desired articulations.

Particularly it is an object of this invention to set forth an articulated vehicle comprising first means defining a given vehicular unit having a given axis of travel; second means defining another vehicular unit having a prescribed axis of travel; one of said first and second means having a plurality of means pivotably coupled said units together, on a same plurality of pivotable axes, for coincident travel of said units at a prescribed proximity therebetween; and third means, coupled to one of said units and to one coupling means of said plurality thereof, operative (a) for displacing at least one of said units to alter its axis of travel, and (b) for changing said prescribed proximity to another proximity.

Further objects of this invention, as well as the novel features thereof, will become more apparent by reference to the following description taken in conjunction with the accompanying figures, in which.

Figure 1:
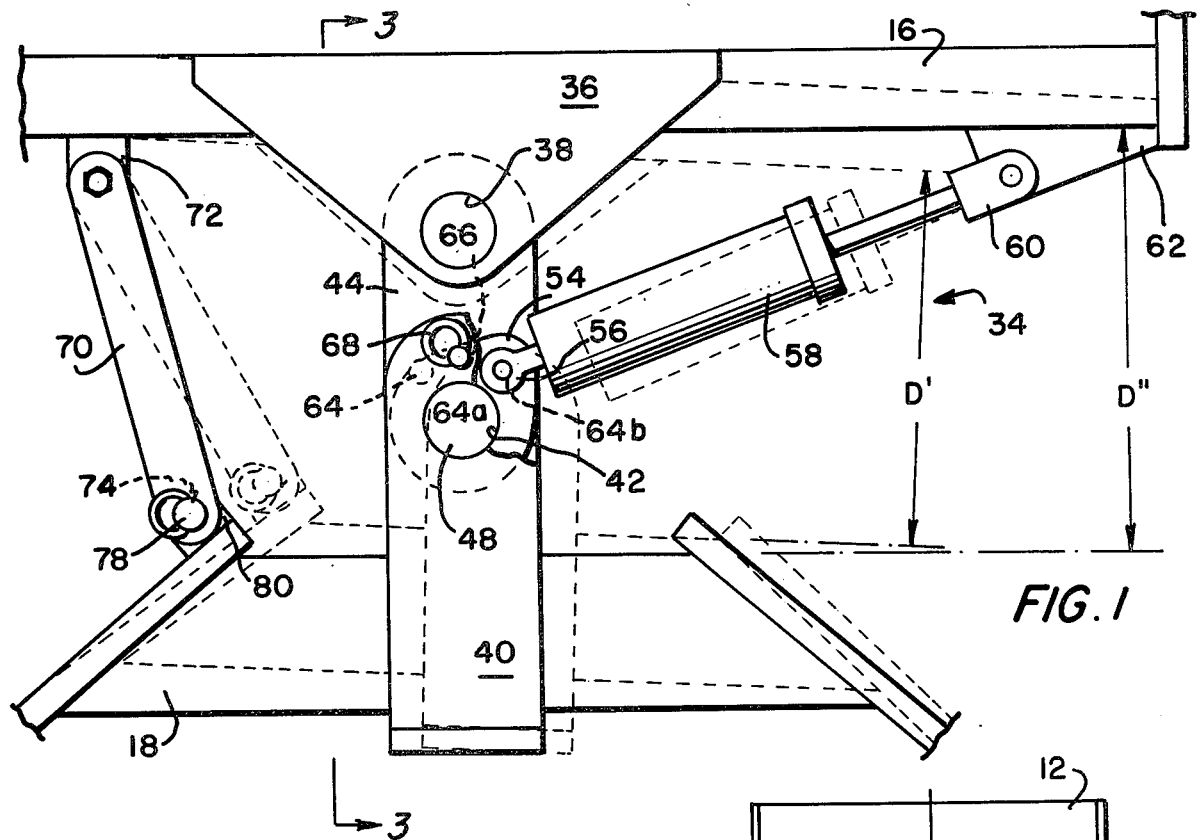
FIG. 1 is an enlarged, detail illustration of the coupling and actuator arrangement of the FIG. 2 embodiment.

As shown in the figures, a drum-type, asphalt compactor 10 has a leading, drum-compactor unit 12 and a trailing, drum-compactor unit 14. Each unit has a frame 16 and 18, respectively, in which are rotatably journalled compacting drums 20 and 22. A power unit (not shown) is confined within a housing 24 which is secured to frame 16, and an operator's station 26, having left-hand and right-hand seats 28 and 30 and controls 32, is provided between drum 22 and the housing 24 upon frame 18.

Units 12 and 14 are coupled together for articulation and common travel by coupling means 34. The details of the latter can be seen to greater advantage in FIGS. 1 and 3.

Figure 3:
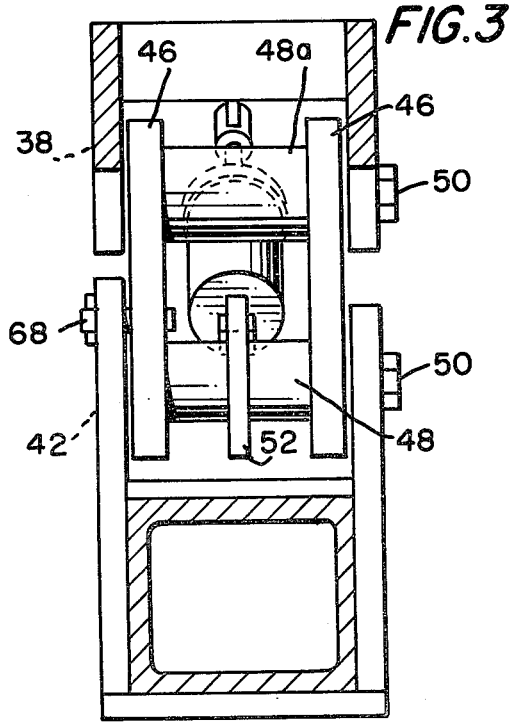
FIG. 3 is a side view, partly cross-sectional, taken along section 3—3 of FIG. 1.

As shown in FIGS. 1 and 3, frame 16 has a pair of triangular-shaped weldments 36 extending therefrom which have boreholes 38 formed therethrough. Frame 18 has a pair of limbs 40 extending therefrom as well, which also have boreholes 42 formed therethrough. A link 44 is pivotably coupled between said frames 16 and 18 by attachment, at opposite ends thereof, to said weldments 36 and said limbs 40, respectively. Link 44 comprises a pair of identical plates 46 which are fixed in spaced apart parallelism by pivot shafts 48 and 48a. Ends of the shafts 48 and 48a extend beyond the plates, and are received in the boreholes 38 and 42. Hardware 50 holds each shaft 48 and 48a in place.

Intermediate the length of shaft 48 there is an annulus 52 which has a lobe 54 extending therefrom. The cylinder-end clevis 56 of a hydraulic actuator 58 is pivotably pinned to the lobe 54. An opposite piston-rod-end clevis 60 of the actuator 58 is pivotably pinned to a gusset 62 integral with frame 16.

Figure 2:
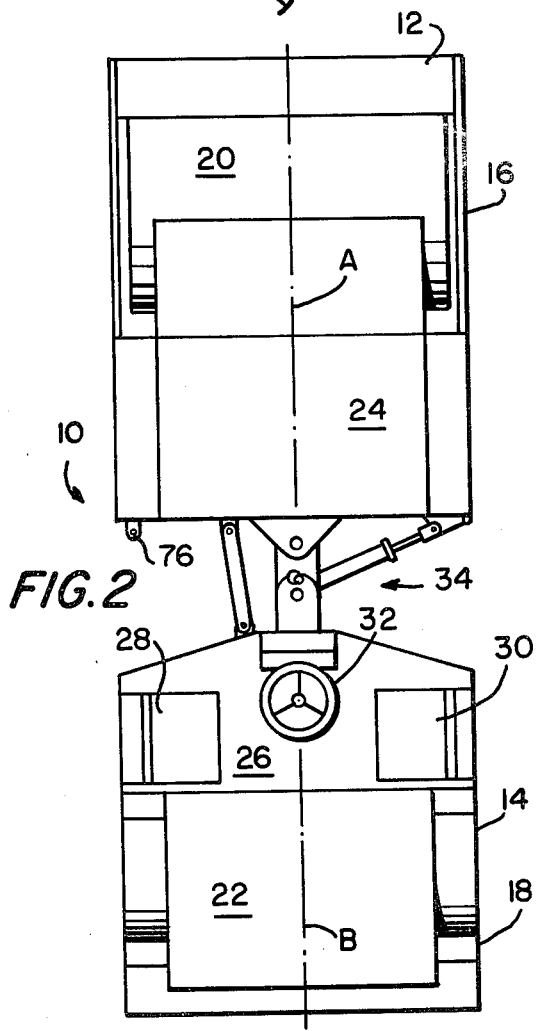
FIG. 2 is a plan view of an articulated, drum-type, asphalt compactor according to an embodiment of the invention.

The uppermost plate 46, i.e., the one partially visible in FIG. 1, and at the left-hand side in FIG. 3, has three pinholes 64, 64a, and 64b formed therethrough. Additionally, the uppermost limb 40 has a single pinhole 46 formed therethrough. All four pinholes are on an arc drawn from the radial center of pivot shaft 48. Accordingly, pinhole 66 can be aligned with any one of the pinholes 64, 64a, and 64b. As shown in FIGS. 2 and 3, in full line illustration, pinholes 64a and 66 are in alignment, and a lock pin 68 is passed thereinto to keep them in alignment.

With the aforedescribed arrangement, it will be appreciated that actuator 58 is all that needs to be operated to cause the compactor 10 to steer to the left or to the right. With the lock pin 68 in place, as described, and the actuator 58 inoperative, the travel axes "A" and "B" of units 12 and 14, respectively (FIG. 1) remain in line. Then, by extending or contracting the actuator 58, the compactor 10 is steered to the left or to the right, respectively.

The invention, however, comprehends means for causing the compactor 10 to execute crab steering. In this, of course, the travel axes "A" and "B" become offset from one another, to subsist in parallel planes. The compactor frames 16 and 18 are shown, in FIG. 1, in dashed outline, in such a crab steering arrangement.

A further link, or lock bar 70 is pivotably cantilevered from frame 16. It is pivoted from frame 16 on a support 72, and the outermost end has a pinhole 74 formed therein. Frame 16 has an apertured boss 76 fixed thereto, and the lock bar 70, when not in use, is swung to the boss 76 and a latch pin 78 is passed into the pinhole 74 and the aperture in the boss 76. When lock bar 70 is in use, however, it is to facilitate crab steering. In such latter circumstance, the lock bar 70 is released from the boss 76 and swung until the pinhole 74 aligns with another apertured boss 80 fixed to the frame 18. This is done with the units 12 and 14 in straight linear alignment (per FIG. 2, and the full-line illustration of FIG. 1). Then the latch pin 78 is passed through the pinhole 74 and the apertured boss 80.

To put the compactor 10 in a right crab mode, next the lock pin 68 is withdrawn from pinholes 64a and 66, and the actuator 58 is retracted until pinholes 66 and 64 come into alignment. Then the lock pin 68 is passed into the latter (pinholes 66 and 64) and the compactor 10 is in a right crab mode. To accommodate subsequent left and right steering in this mode, the lock bar 70 is returned to an inoperative position secured to boss 76. The dashed-outline illustration in FIG. 2 shows the attitudes of the frames 16 and 18 in the right crab mode. To dispose the compactor 10 in a left crab mode, of course, the reverse of the aforesaid procedure is to be performed. That is, the actuator 58 must be extended until pinholes 66 and 64b come into alignment—to receive the lock pin 68.

As the dashed-outline illustration (FIG. 1) shows, the rotation of the annulus 52, for pinning holes 66 and 64 (or 66 and 64b) foreshorten the distance between units 20 and 22. Hence, when the compactor 10 is set in either crab steering mode, the units 20 and 22 are in a slightly closer proximity (i.e. distance D') than when the straight tracking and/or steering mode is in use, the proximity in the latter case being distance D".

It is particularly to be noted that full articulation of the compactor 10, according to my invention, is accomplished by use of a single actuator.

While I have described my invention in connection with a specific embodiment thereof, it is to be clearly understood that this is done only by way of example and not as a limitation to the scope of my invention as set forth in the objects and in the appended claims.

I claim:

1. An articulated vehicle, comprising:
   first means defining a given vehicular unit having a given axis of travel;
   second means defining another vehicular unit having a prescribed axis of travel;
   one of said first and second means having a plurality of means pivotably coupling said units together, on a plurality of pivotable axes, for coincident travel of said units at a prescribed proximity therebetween; and
   third means, coupled to one of said units and to one coupling means of said plurality thereof, operative (a) for displacing at least one of said units to alter its axis of travel, and (b) for changing said prescribed proximity to another proximity.

2. An articulated vehicle, according to claim 1, wherein:
   said third means comprises a single, reciprocatable actuator.

3. An articulated vehicle, according to claim 1, wherein:
   said plurality of coupling means comprise means for disposing said units for coincident travel, as aforesaid, with said given and prescribed axes of travel in parallelism at said another proximity.

4. An articulated vehicle, according to claim 2, wherein:
   said plurality of coupling means and said actuator comprise means cooperative for disposing said units for coincident travel, as aforesaid, with one of said units (a) tracking directly along in alignment with the axis of travel of the other of said units, and (b) tracking along a travel axis thereof which is offset from said other unit travel axis.

5. An articulated vehicle, according to claim 2, wherein:
   said actuator and said coupling means comprise means cooperative for disposing said units for such aforesaid coincident travel with one of said units (a) tracking directly along in alignment with the axis of travel of the other of said units, (b) tracking along a travel axis thereof which is offset, in a given direction, from said other unit travel axis, and (c) tracking along a travel axis thereof which is offset, in a direction opposite to said given direction, from said other unit travel axis.

6. An articulated vehicle, according to claim 1, wherein:
   said coupling means comprises a first link, pivotably coupled at opposite ends thereof, to said units; and
   said coupling means further comprises a second link, pivotably coupled at opposite ends thereof, to said units; wherein
   said first link is pivotably secured (a) at one end thereof by a pivot pin held fast in one of said units, and (b) at the opposite end thereof by a pivot pin which is freely and slidably disengageable from both the other of said units and said opposite end.

7. An articulated vehicle, according to claim 6, further including:
   means coupled to said second link preventing relative pivotable movement between one of said units and said second link.

8. An articulated vehicle, according to claim 7, wherein:
   said second link has a pin hole formed therein;
   one of said units has a limb extending therefrom;
   said second link is pivotably coupled to said limb;
   said limb has a pin hole formed therein; and
   said movement-preventing means comprises a locking pin freely and slidably engaged with, and disengageable from, said pin holes.

9. An articulated vehicle, according to claim 8, wherein:
   said limb and said second link comprise a pair of members, one of said members overlying the other thereof, pivotable therebetween about a given one of said pivotable axes;
   one of said members has a plurality of pin holes formed therein along a given arc drawn from said one given pivotable axis; and
   the other of said members has but a single pin hole formed therein, said single pin hole also being formed along said given arc.

10. An articulated vehicle, according to claim 9, wherein:
    said second link is said one member; and
    said limb is said other member.

11. An articulated vehicle, according to claim 6, wherein:
    said third means comprises a reciprocatable actuator;
    said actuator is coupled, at one end thereof, to one of said opposite ends of said second link.

12. An articulated vehicle, according to claim 11, wherein:
    said actuator is pivotably coupled (a) to said one end of said second link, and (b) to one of said units.

* * * * *